(No Model.)
A. W. VON SCHMIDT.
WATER JACKET FOR ROTARY PUMPS.
No. 299,186. Patented May 27, 1884.
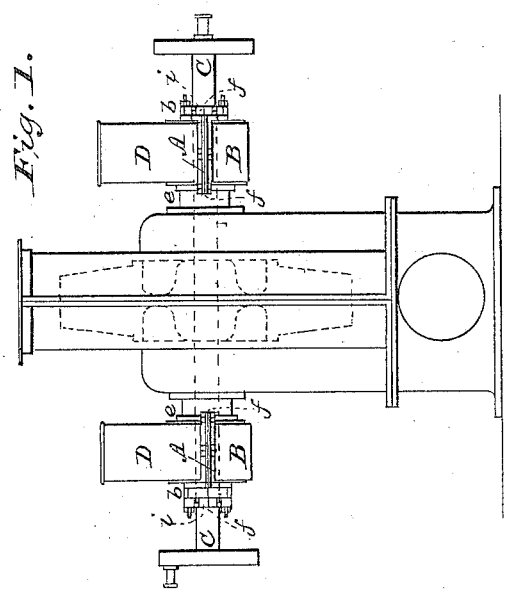
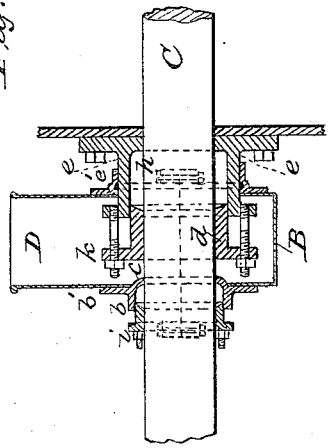
Witnesses:
J. E. Brecht
David H. Mead
Inventor:
Alexey W. Von Schmidt,
B. Wm. C. McIntire
Attorney.

United States Patent Office.

ALLEXEY W. VON SCHMIDT, OF SAN FRANCISCO, CALIFORNIA.

WATER-JACKET FOR ROTARY PUMPS.

SPECIFICATION forming part of Letters Patent No. 299,186, dated May 27, 1884.

Application filed July 28, 1883. (No model.)

*To all whom it may concern:*

Be it known that I, ALLEXEY W. VON SCHMIDT, of the city and county of San Francisco, and State of California, have invented a new and improved water-jacket to prevent air from entering into rotary pumps through the stuffing-boxes on main shaft; and I do hereby declare that the following is a full, true, and exact description thereof, reference being had to the accompanying drawings, and to letters of reference marked thereon, making a part of this specification.

My invention relates to an improvement in stuffing-boxes, designed particularly for use on rotary pumps, but applicable to equivalent uses where the ordinary stuffing-box is insufficient to exclude all air.

The invention consists of a packing-box adapted to be placed on the shaft of the pump at the point of entrance, the peculiar construction of which box adapts it to contain a supply of water, and hold the same in a position to completely surround the shaft and prevent the passage of air along the same into the body of the pump.

In order that those skilled in the art may know how to make and use my improved packing-box, I will now proceed to describe the same in connection with a rotary pump, by the aid of the accompanying drawings, in which—

Figure 1 is an end elevation showing the boxes in position. Fig. 2 is a sectional view of one of the boxes, showing it in position on the shaft. Fig. 3 is an end external view of the box, and Fig. 4 is a side elevation with the tanks removed.

In these drawings, A A' represent two rectangular frames, which extend in line with the shaft of the pump. The sides of these frames are composed of bars of metal, right-angular in cross-section, thus forming two flanges, one extending upwardly and the other laterally. To the upwardly-projecting flange of the upper frame, A, I attach, by means of rivets and solder, the tank D, and to the corresponding downward-projecting flange of the frame A', I attach by similar means the tank B. The two frames are secured together by rivets passing through openings in their corresponding lateral flanges. The outer ends of both tanks B and D have semicircular openings to receive the collar $b$, and the joint between the collar and tanks is made by riveting the tanks to the flange $b'$ of the ring. To insure a tight joint between the collar and the shaft, I provide the said collar with a flange, $c$, which fits closely around the shaft; and I also place on the shaft a packing-ring, $i$, upon which the flange $i'$ of the collar binds. The box is secured in place and prevented from turning with the shaft by the collar $e$, which is T-shape in cross-section, as shown in Fig. 2. This collar is bolted firmly to the side of the main body of the pump, and has its laterally-extending flange $e'$ encircled by the inner sides of the frames A and A'. At the point of juncture between the frames and the collar $e$, I interpose a packing-ring, $h$, which is partly inclosed in a groove in the contiguous faces of the frames, so that when the frames are firmly bolted together the ring is compressed and a perfectly air-tight joint formed. To prevent the escape of the water contained in the tanks, or the further passage of any air which may find its way into the tank, I provide the broad packing-ring $d$, having an upturned rim, $k$, and secure it to the flange $e'$ of the ring $e$ by bolts passing through the said rim $k$ and a corresponding flange, $e^2$, of the collar.

Besides the fact that the presence of a water-jacket around the shaft effectually prevents the ingress of water, it may be mentioned that the presence of water in the bearings will prevent their becoming overheated.

Having thus described my invention, what I claim is—

1. In a packing-box for pump-shafts, the combination, with the collars $e$ and $b$, of the water-tank, adapted to contain water to envelop the said shafts, substantially as described.

2. In a packing-box for pump-shafts, the combination of the collars $e$ $b$, the frames A A', and the tanks D B, substantially as described.

3. The combination, with a pump-shaft, of the collars $e$ and $b$, frames A A', and packing-ring $h$, substantially as described.

4. The combination, with a pump-shaft, of the collars $e$ and $b$, frames A A', tanks D and B, and the packing-ring $d$, all substantially as described.

ALLEXEY W. VON SCHMIDT.

Witnesses:
WILLIAM G. DOOLITTLE,
JULIUS H. VON SCHMIDT.